Dec. 19, 1961    B. G. JANSON    3,013,735
METHOD OF REMOVAL OF RESIN
Filed Feb. 4, 1959
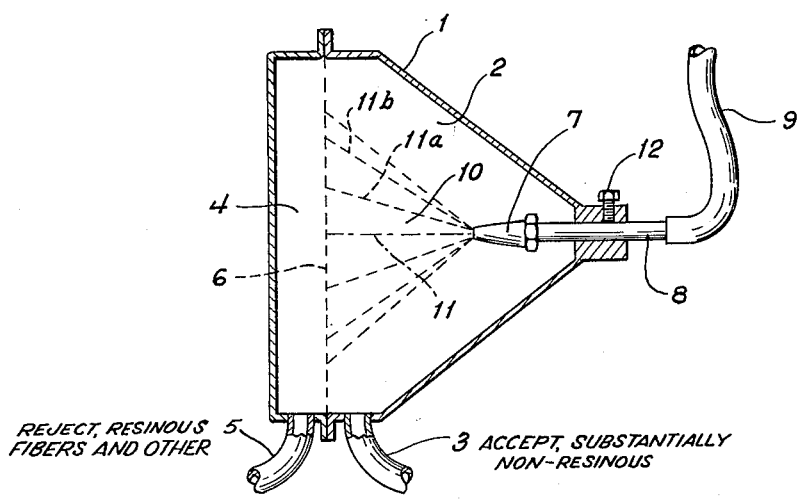
REJECT, RESINOUS FIBERS AND OTHER — 5
3 — ACCEPT, SUBSTANTIALLY NON-RESINOUS
INVENTOR.
BENGT GOTTHARD JANSON
BY
ATTORNEY 3,013,735
METHOD OF REMOVAL OF RESIN
Bengt Gotthard Janson, Vallvik, Sweden, assignor to Aktiebolaget Celleco, Stockholm, Sweden, a corporation of Sweden
Filed Feb. 4, 1959, Ser. No. 791,022
Claims priority, application Sweden Feb. 10, 1958
3 Claims. (Cl. 241—24)

The present invention relates to the removal of resin from a resiniferous aqueous pulp sludge of cellulose fibre.

The content of resin in sulphite pulp, for example, consists of about 70% resin, bound to the medullary rays, and about 30% free resin in the form of small balls. The cells of the medullary rays are very much shorter than the so-called utility fibre, and form the so-called resiniferous fibres, which together with short fragments of the utility fibres are called O-fibres. With this form of occurrence of the resin it is possible to remove the resin from the pulp by methods of fractionating the fibres. Various such methods in which straining of the pulp is the characteristic feature have been adopted, and in this manner it has been possible to remove the resin to a higher or lower degree together with the fraction which passes through the strainer. A certain loss of utility fibre, at least in the form of a short fraction, dependent on the degree of resin removal is unavoidable in this connection, but it is of course highly desirable that this loss should be kept as low as possible.

Normally, it is quite sufficient, for example when the method is applied to spruce sulphite pulp with a resin content of about 1.5%, to remove about 40% of that content. With methods hitherto applied for this purpose it has been possible to attain this degree of resin extraction with a fibre loss of about 3.5%.

Another desirable object is to provide a method which can be applied with a high capacity without bulky and expensive apparatus, which means in the first place that the strainer surface should have a high capacity, expressed in weight of dry pulp per unit of time and unit of surface, while the necessary high degree of resin removal and the low loss of fibre are maintained at the same time. This is especially difficult to accomplish as it demands the strainer surface must be highly penetrable to resin fibres and resin balls, as well as act highly retaining for other fibres, including the short fragments of resinless ones, which presupposes a compromise in respect of the mesh-width of the strainer-surface. In addition it is a necessary condition that even if a mesh-width is selected which is acceptable from this point of view it must be possible in operation to keep the strainer-surface at least essentially free from a deposit of fibrous matting as this naturally would spoil the required balancing effect by clogging the strainer-surface.

To prevent such a deposit a special agitating equipment has been arranged in the immediate vicinity of the strainer surface to provide turbulence therein, or the pulp has been applied as closely parallel as possible to the strainer-surface. In spite of such steps it has nevertheless been necessary at the same time to limit the concentration of the pulp sludge to a relatively small value, which in itself constitutes a limitation of the quantity of fibres supplied together with the sludge, that is to say a limitation of the capacity. The pumping work per unit of weight of dry pulp also increases with the degree of dilution.

In apparatus hitherto used it has not been possible in most cases to obtain strainer capacities exceeding about 10 kg. dry pulp/m.² and minute, or to work with a higher concentration of pulp than about 0.3%.

However, based on his own experiments with a method which has not been previously used for removal of resin, the inventor has found that it is possible to attain by simple means results which are far superior to those hitherto obtained.

The essential feature of the invention resides in the fact that the resiniferous pulp sludge is sprayed through one or several centrifugal spray nozzles, acting to finely divide or to atomize the pulp sludge, in the form of a full diverging spray or jet against a strainer-wall placed at a distance from the sprayer, with the central axis of the spray directed substantially perpendicular to said strainer wall.

In this way it has been possible, for example, with a degree of resin-removal of 40%, to limit the loss of fibres to about 1.5% as compared with the earlier removal of 3.5%, while maintaining a capacity of the strainer surface amounting to about 40 kg. dry pulp/m.² and minute as compared with 10 kg. earlier, and to supply the pulp sludge with a concentration of about 0.7% as against a previous maximum of 0.3%.

An explanation of this surprising advance will be given in connection with a more detailed description of the invention with reference to the accompanying drawing which diagrammatically and as an example illustrates a cross-section of an apparatus operating according to the invention.

In the drawing, 1 is a casing enclosing a chamber 2 with a bottom outlet 3 and a chamber 4 with a bottom outlet 5, said chambers being separated by a strainer-wall 6. A centrifugal spray nozzle 7 in the chamber 2 is arranged to receive resinous sludge through a pipe 8 and a hose 9 from a gravity tank for such sludge, not shown in the figure, and thereby to finely divide and direct solid diverging jet or spray 10 of said sludge against the strainer-wall with the central axis 11 of said spray directed perpendicular to the strainer-surface. Such spray nozzles of standard type working according to the centrifugal principle, for instance, may be purchased from any dealer in such equipments.

Due to the diverging shape of the spray all particles all around the center line of it will run radially outwards as well as axially in the spray along trajectories, for instance 11a and 11b, in a direction which is the more oblique to the strainer-surface the more distant from the center line the trajectory is situated. Thus, by the oblique impact of the spray nozzles, a scattering or splitting effect on felting deposits otherwise tending to accumulate on the strainer-surface is exerted constantly driving off such deposits from that surface in all radial directions from the center of the impact area of it, that is to say a self-cleansing of the strainer-surface is obtained without any additional means. At the same time the considerable impact force perpendicular to that surface promotes the filtering effect through the strainer-surface thus cleaned. The combination of these two effects renders it possible to use a very fine-meshed strainer giving it is a minimum of losses of non-resinous fibres and nevertheless obtaining a great straining capacity with high rate of resin removal.

When applied to a resinaceous pulp this method of fractionating also has a special effect in addition to that of conventional fractionating of fibres according to size. The resinaceous particles, both in the form of resinous fibres and resinous balls, have a greater specific gravity than the non-resinous fibre and therefore acquire a greater striking power in the jet against the strainer and a greater capacity to penetrate this strainer than the non-resinous fibres, whereby the possibility of removing the resin effectively with a low loss of fibres is highly increased while employing a very fine-meshed strainer-surface.

Also by employing centrifugal spray nozzle for the distribution of the resinous sludge an effect of great importance for the resin removal will be gained in addition to or apart from the above mentioned favorable effects. It is known, for example from Swedish Patent 123,534, that the resin deposits and separates from the fibres more readily if the pulp if subjected to mechanical treatment before being applied to the strainer-surface, and it has therefore been suggested first to subject the pulp to heavy pumping or beating, or to spraying or allowing it to fall against a baffle face. This calls for special power consuming additional devices which are more or less expensive. Probably on this account, and/or because the importance of such treatment has been underrated, it has not been adopted generally. The centrifugal spray nozzle is, however, in addition to its function as a sprayer, a device by which the pulp is processed in an extremely intensive manner and thus it is possible by means of the method according to the invention, without any additional devices, to subject the pulp to such a pretreatment in the jet striking the surface of the strainer.

The above-mentioned tests have also shown that for every concentration of pulp there is an optimal width of mesh, which gives the best result, and that the degree of removal of the resin for every width of mesh varies with the surface capacity in accordance with a curve having a distinctive maximum at a determined surface capacity. On both sides of this maximum value the degree of removal of resin falls rather rapidly. According to the invention the surface capacity or load at a constant amount of pulp supplied feed through the sprayer is set at the favourable value by moving the sprayer towards or away from the wall of the stainer so that the jet will cover a smaller or larger zone thereof, respectively. In doing so it is also possible, while maintaining the most favourable surface capacity or load, to vary the supply by changing the supplying pressure and/or the passage cross-section of the sprayer, or by exchanging the sprayer and, in connection therewith, varying distance to the strainer-wall. An increase of the feed or the quantity of pulp supplied must consequently be followed by an increase of this distance, and vice versa when this quantity is reduced. A change of the diffusion or diverging angle of the spray may also be imagined; in this case a smaller angle in itself should be accompanied by a greater distance, and vice versa if the angle is increased.

It is therefore obvious that the possibility of varying the distance of the spray nozzle to the strainer wall is of essential importance for the possibilities of controlling the method according to the invention, and that these possibilities will be very pronounced within the range of the most effective sphere of the method.

The above mentioned tests have also shown that for a given mesh and concentration of pulp the resin removal capacity varies with the strainer, load, i.e. the quantity of pulp supplied per time unit in relation to the effective strainer area which is equal to the impact area of the spray against the strainer wall, so that an optimum capacity will be obtained within a certain range of impact area. Now the impact area at a definite spray angle depends on the distance between the spray nozzle and the strainer wall so that increase in said distance will cause increase in said area. Thus, optimum capacity will also be obtained within a certain range of nozzle distance. After loosening stop screw 12 the nozzle may be removed to and from the strainer wall and a position giving optimum capacity may thus be tried out under each of various working conditions in other respects.

A variation of base data may call for another adjustment. An increase in nozzle capacity by increase in nozzle supply pressure will, for instance, result in an increase in strainer load if the impact area is not correspondingly increased which, however, may be brought about by increasing the nozzle distance. A decrease in nozzle capacity should consequently be met by decreasing that distance.

What I claim is:

1. In the removing of resin from an aqueous suspension of resinous and non-resinous cellulose pulp fibres and resin particles by passing part of the suspension, containing substantially resinous fibres and resin particles, through a screen-wall, while retaining the remaining part of the suspension, containing substantially non resinous fibres, on the feed side of the screen and withdrawing, in separated relationship, the part passed through the screen wall and the part retained, the method comprising in combination the steps of passing said suspension through a spray nozzle of the whirling chamber type so as to form from said suspension a full spray of finely divided suspension particles, directing said spray along a central axis, impinging said spray against said screen wall with said screen wall arranged at a distance from said spray nozzle and with the central axis of said spray directed substantially perpendicularly to said screen wall, constantly cleaning an area of said screen in all radial directions from the center of the area of impact of said spray against said screen wall by the action of the splitting effect of the diverging spray against said screen wall to prevent felting deposits of retained material tending to accumulate on said screen wall thereby maintaining a portion of screen wall within the impact area constantly unobstructed from such deposits and forcing the portion of said suspension containing substantially resinous fibers and resin particles through said unobstructed portion of the screen wall by the impact effect of the spray against the screen wall.

2. Method according to claim 1 wherein the resin removal effect is controlled by varying the distance between the spray-nozzle and the strainer-surface.

3. Method according to claim 1 wherein in varying the quantity of pulp supplied to the strainer-surface through the spray-nozzle, the distance between the spray-nozzle and the strainer surface is varied in such a way that when said quantity is increased said distance is increased and when said quantity is reduced said distance is reduced.

References Cited in the file of this patent

UNITED STATES PATENTS

| | | |
|---|---|---|
| 654,132 | Bush | July 24, 1900 |
| 1,127,615 | Gilligan | Feb. 9, 1915 |
| 1,153,805 | MacDonald | Sept. 14, 1915 |
| 1,420,362 | Billingham | June 20, 1922 |
| 1,764,570 | Lohman | June 17, 1930 |
| 2,624,517 | Smith | Jan. 6, 1953 |
| 2,829,874 | Freeman | Apr. 8, 1958 |
| 2,874,840 | Simpson | Feb. 24, 1959 |
| 2,915,252 | Umbrecht | Dec. 1, 1959 |